United States Patent
Hou

(10) Patent No.: US 12,013,078 B2
(45) Date of Patent: Jun. 18, 2024

(54) SUPPORT DRIVING STRUCTURE OF PHOTO BOOTH

(71) Applicant: MARVEL TECHNOLOGY (CHINA) CO., LTD, Shenzhen (CN)

(72) Inventor: Huawei Hou, Shenzhen (CN)

(73) Assignee: MARVEL TECHNOLOGY (CHINA) CO., LTD, Shenzhen (CN)

( * ) Notice: Subject to any disclaimer, the term of this patent is extended or adjusted under 35 U.S.C. 154(b) by 0 days.

(21) Appl. No.: 18/453,669

(22) Filed: Aug. 22, 2023

(65) Prior Publication Data

US 2024/0011598 A1    Jan. 11, 2024

Related U.S. Application Data

(63) Continuation-in-part of application No. 17/742,421, filed on May 12, 2022.

(30) Foreign Application Priority Data

Feb. 18, 2022  (CN) .......................... 202220333812.8

(51) Int. Cl.
*F16M 11/08*    (2006.01)
*F16M 11/18*    (2006.01)

(52) U.S. Cl.
CPC ............. *F16M 11/08* (2013.01); *F16M 11/18* (2013.01)

(58) Field of Classification Search
CPC ....... G03B 17/561; F16M 11/18; F16M 11/08
See application file for complete search history.

(56) References Cited

U.S. PATENT DOCUMENTS

| | | | | |
|---|---|---|---|---|
| 2,140,602 A | * | 12/1938 | Simjian | G03B 19/023 396/338 |
| 4,236,795 A | * | 12/1980 | Kephart | G03B 15/06 396/428 |
| 4,372,659 A | * | 2/1983 | Ogawa | G03B 15/00 396/24 |
| 5,857,119 A | * | 1/1999 | Borden | G03B 15/00 396/428 |
| 8,909,035 B2 | * | 12/2014 | Jancourtz | G03B 15/00 248/123.2 |
| 9,641,730 B2 | * | 5/2017 | Rosenberry | F16M 13/00 |
| 11,665,306 B1 | * | 5/2023 | Hou | G03B 37/02 348/40 |

(Continued)

*Primary Examiner* — Bradley Duckworth
(74) *Attorney, Agent, or Firm* — Daniel M. Cohn; Howard M. Cohn

(57) ABSTRACT

A support driving structure of a photo booth includes: a supporting main shaft, a driven wheel, and a rotating arm. The driven wheel is sleeved on the supporting main shaft and is rotatably connected to the supporting main shaft. The rotating arm is connected to an end surface of the driven wheel. The driven wheel is rotatably connected to the supporting main shaft through a bearing. The rotating arm is connected to the end surface of the driven wheel through screws. The rotating arm is of a frame structure. The rotating arm includes long rods, short rods, and connecting sheets. Two ends of each of the short rods and two ends of each of the connecting sheets are both connected to the two long rods. Connecting positions are defined on the connecting sheets. Connecting portions corresponding to the connecting positions are disposed on the driven wheel.

19 Claims, 6 Drawing Sheets

(56) References Cited

U.S. PATENT DOCUMENTS

| | | | |
|---|---|---|---|
| 11,720,000 B1* | 8/2023 | Huang | F16M 11/046 |
| | | | 362/8 |
| 2019/0317383 A1* | 10/2019 | Llewelyn-Davies | H04N 23/54 |
| 2021/0223668 A1* | 7/2021 | Wiley, Jr. | F16M 11/10 |
| 2021/0286236 A1* | 9/2021 | Kato | H04N 13/221 |
| 2023/0168566 A1* | 6/2023 | Zhang | G03B 17/561 |
| | | | 396/2 |

* cited by examiner

SUPPORT DRIVING STRUCTURE OF PHOTO BOOTH

TECHNICAL FIELD

The present disclosure relates to a technical field of shooting devices, and in particular to a support driving structure of a photo booth.

BACKGROUND

In order to display products or a person 360 degrees and facilitate taking videos or pictures, in the prior art, CN patent application number CN 2169763070 discloses a shooting booth, where a horizontal rod is rotatably sleeved on a connecting rod. The horizontal rod is configured to install a shooting device and shooting accessories assisting the shooting device in shooting. A counterweight block is slidly disposed on one side of the horizontal rod opposite to the shooting device. The counterweight block is configured to adjust balance of two opposite sides of the horizontal rod and prevents the horizontal rod from excessively inclining.

Further, CN patent application number CN214093731U disclose a rotating shooting booth, where a middle shaft is sleeved on a bearing sleeve. A bearing is disposed between the bearing sleeve and the middle shaft. The bearing sleeve is rotatable relative to the middle shaft. A horizontal rod is divided into two square short rods, and the two square short rods are connected to the bearing sleeve. A first end of the horizontal rod is connected to a counterweight block, and a second end of the cross rod is connected to a camera.

In the prior art, the counterweight block are additionally provided to balance the horizontal rod, resulting in more materials for product manufacturing, higher cost, and structural redundancy. In addition, the horizontal rod rotates around the connecting rod or the middle shaft, requiring manual pushing, which easily leads to uneven speed, resulting in unsatisfactory shooting effects and jittering of shooting image.

SUMMARY

In order to solve technical problems in background, the present disclosure provides a support driving structure of a photo booth.

To realize above purpose, the present disclosure provides the support driving structure of the photo booth including: a supporting main shaft, a driven wheel, and a rotating arm. The driven wheel is sleeved on the supporting main shaft and is rotatably connected to the supporting main shaft. The rotating arm is connected to an end surface of the driven wheel.

Furthermore, the driven wheel is a gear.

Furthermore, the driven wheel is a belt wheel.

Furthermore, the driven wheel is rotatably connected to the supporting main shaft through a bearing.

Furthermore, the rotating arm is connected to the end surface of the driven wheel through screws.

Furthermore, the rotating arm is connected to the end surface of the driven wheel through welding.

Furthermore, the rotating arm is of a frame structure.

Furthermore, the rotating arm includes long rods, short rods, and connecting sheets. Two ends of each of the short rods are connected to the two long rods. Two ends of each of the connecting sheets are connected to the two long rods. Connecting positions are defined on the connecting sheets. Connecting portions corresponding to the connecting positions are disposed on the driven wheel.

Furthermore, the rotating arm includes long rods, short rods, and a connecting plate. Two ends of each of the short rods are connected to the two long rods. Four edges of the connecting plate are connected to the short rods and the long rods. Connecting positions are defined on the connecting plate. Connecting portions corresponding to the connecting positions are disposed on the driven wheel. A limiting hole is defined on the connecting plate. The limiting hole allows the supporting main shaft to pass through.

Furthermore, the rotating arm includes long rods and a connecting plate. A first edge and a second edge of the connecting plate are connected to the two long rods. A third edge and a fourth edge of the connecting plate are bending edges. Connecting positions are defined on the connecting plate. Connecting portions corresponding to the connecting positions are disposed on the driven wheel. A limiting hole is defined on the connecting plate. The limiting hole allows the supporting main shaft to pass through.

Compared with prior art, the present disclosure provides the support driving structure of the photo booth, and the rotating arm is connected to the end surface of the driven wheel, so the rotating arm rotates along with the driven wheel. There is a height difference between the rotating arm and the driven wheel, so that a rotating device on an outer edge of a side surface of the driven wheel is not shielded by the rotating arm. The rotating structure is an electric motor configured to transmit power to the driven wheel, and the driven wheel receives the power to drive the rotating arm to rotate at a uniform speed or a fast, slow, or variable speed. Since the rotating arm is connected to the end surface of the driven wheel, a contact area at a joint thereof is large, providing reliable stability. Therefore, even no counterweight structure is disposed on one end of the rotating arm, the rotating arm effectively balances and supports the shooting device.

Figure 1:
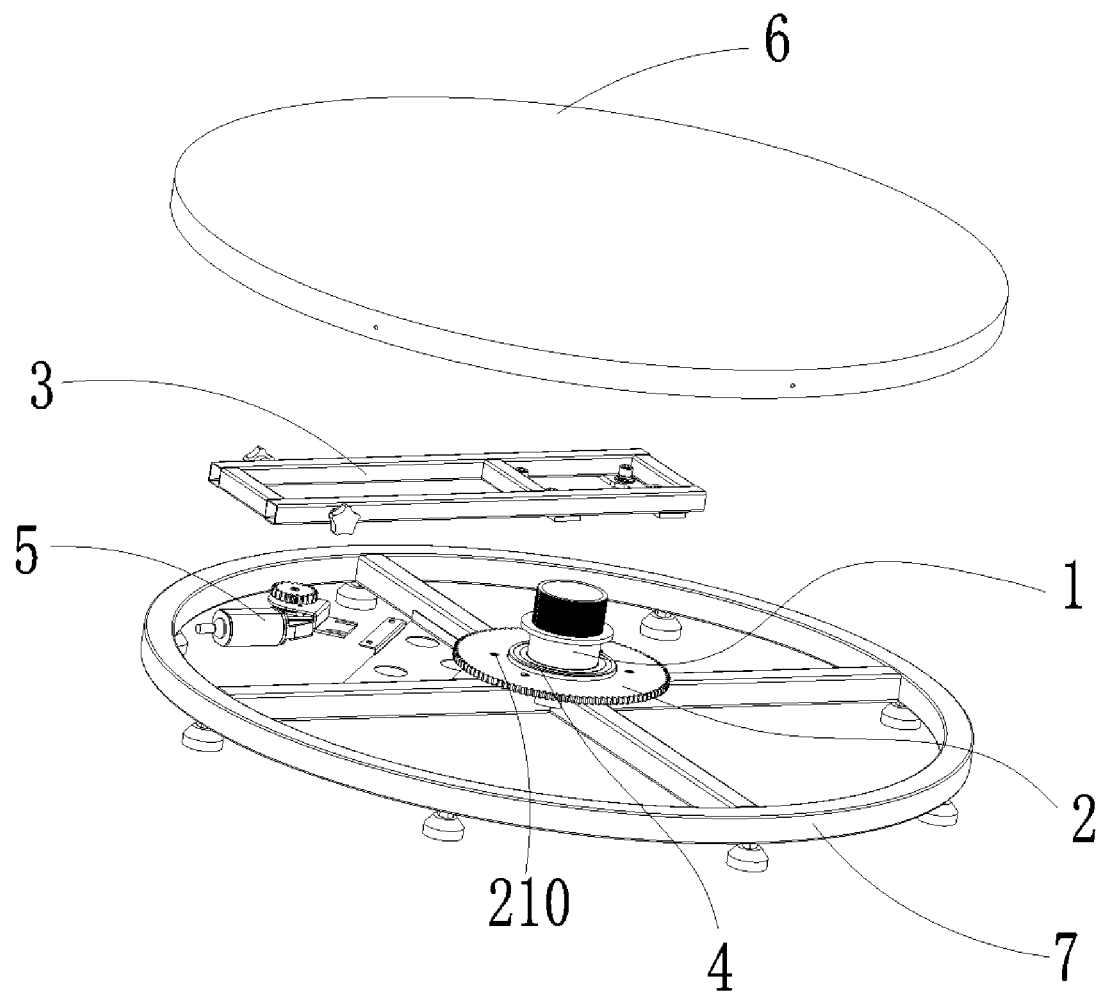
FIG. 1 is an exploded structural schematic diagram of a photo booth according to one embodiment of the present disclosure.

Reference numbers in the drawings: 1. supporting main shaft; 2. driven wheel; 210. connecting portions; 3. rotating arm; 310. long rods; 320. short rods; 330. connecting sheets; 331. connecting positions; 340. connecting plate; 341. limiting hole; 342. bending edges; 4. bearing; 5. rotating device; 6. supporting platform; 7. supporting base.

DETAILED DESCRIPTION

As shown in FIGS. 1-5, the present disclosure provides a support driving structure of a photo booth including: a supporting main shaft 1, a driven wheel 2, and a rotating arm 3. The driven wheel 2 is sleeved on the supporting main shaft 1 and is rotatably connected to the supporting main shaft 1. The rotating arm 3 is connected to an end surface of the driven wheel 2.

The driven wheel 2 is driven by an external rotating device 5 and rotates around the supporting main shaft 1. The rotating arm 3 is connected to the end surface of the driven wheel 2, so the rotating arm 3 rotates along with the driven wheel 2. There is a height difference between the rotating arm 3 and the driven wheel 2, so that the rotating device 5 disposed on an outer edge of a side surface of the driven wheel 2 is not shielded by the rotating arm. The rotating device 5 is selected from a servo motor, a stepping motor, or other motors to transmit power to the driven wheel 2, The driven wheel 2 receives the power to drive the rotating arm 3 to rotate at a uniform speed or a fast, slow, or variable speed.

The rotating arm 3 extends outwards and is configured to connect to a shooting device or a shooting auxiliary device, such as a camera, a mobile phone, a light supplementing lamp, a microphone, and the like. A first end of the supporting main shaft 1 is connected to a supporting platform 6, and a second end of the supporting main shaft 1 is connected to a supporting base 7. The rotating arm 3 is disposed between the supporting platform 6 and the supporting base 7. The rotating arm 3 carries the shooting device to rotate around the supporting platform 6, so the shooting device taking video or pictures of products on the supporting platform 6 or a person stands on the supporting platform 6 from 360 degrees.

In some embodiments, the supporting main shaft 1 is only connected to the supporting base 7, and the supporting platform 6 is supported by another supporting structure. The supporting platform 6 is separated from the supporting base 7, which prevents a situation that when a user jumps on the supporting platform 6, power is transmitted to the supporting main shaft 1, the driven wheel 2, and the rotating arm 3 to cause picture jittering. The supporting structure is obtained from the prior art, and details of which are not described herein.

Since the rotating arm 3 is connected to the end surface of the driven wheel 2, a contact area at a joint thereof is large, providing reliable stability. Therefore, even no counterweight structure is disposed on one end of the rotating arm 3, the rotating arm 3 effectively balances and supports the shooting device.

Optionally, a circle center of the driven wheel 2 coincides with an axis of the supporting main shaft 1.

Figure 2:
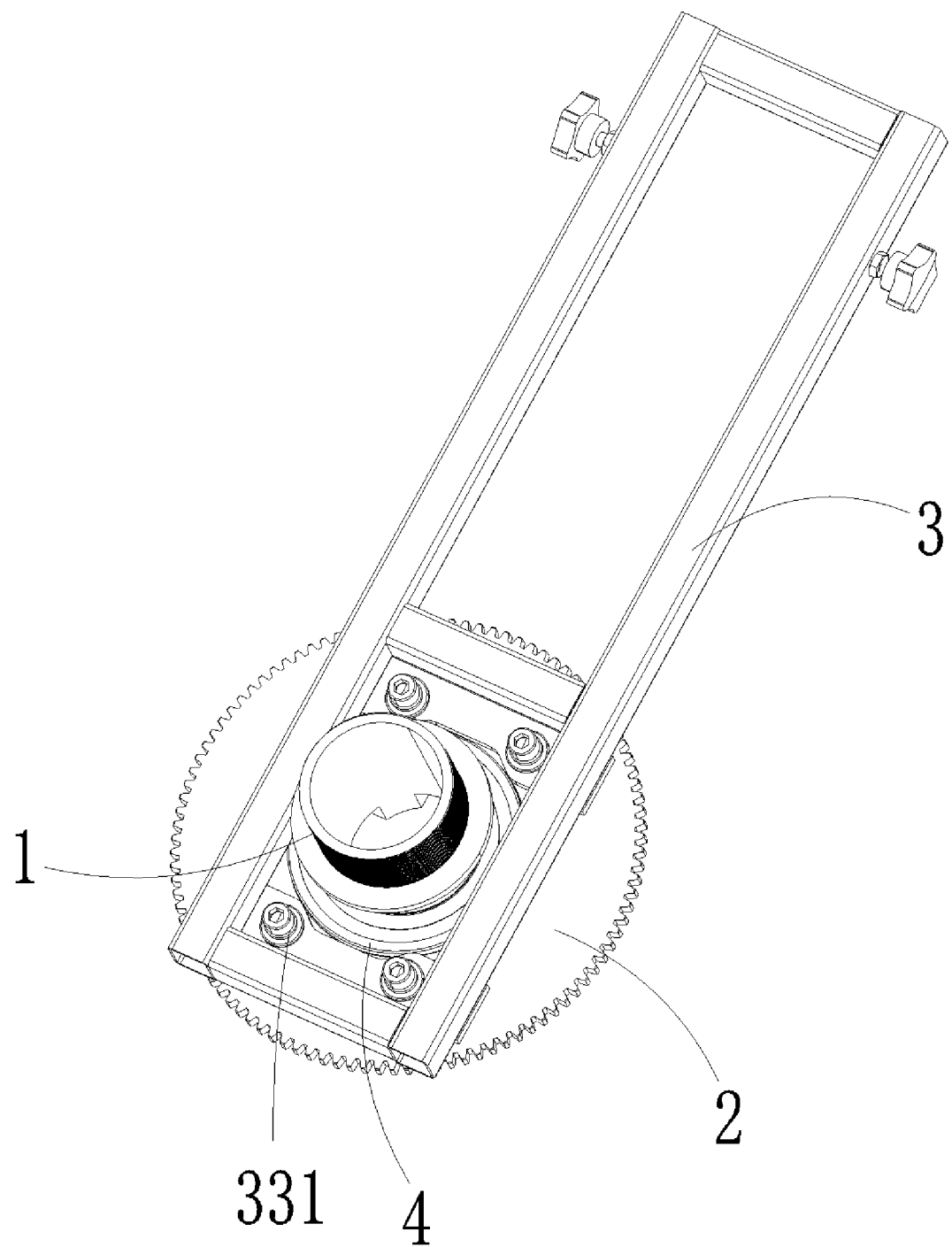
FIG. 2 is a schematic diagram of connection of a support driving structure of the photo booth according to one embodiment of the present disclosure.
Figure 2A:
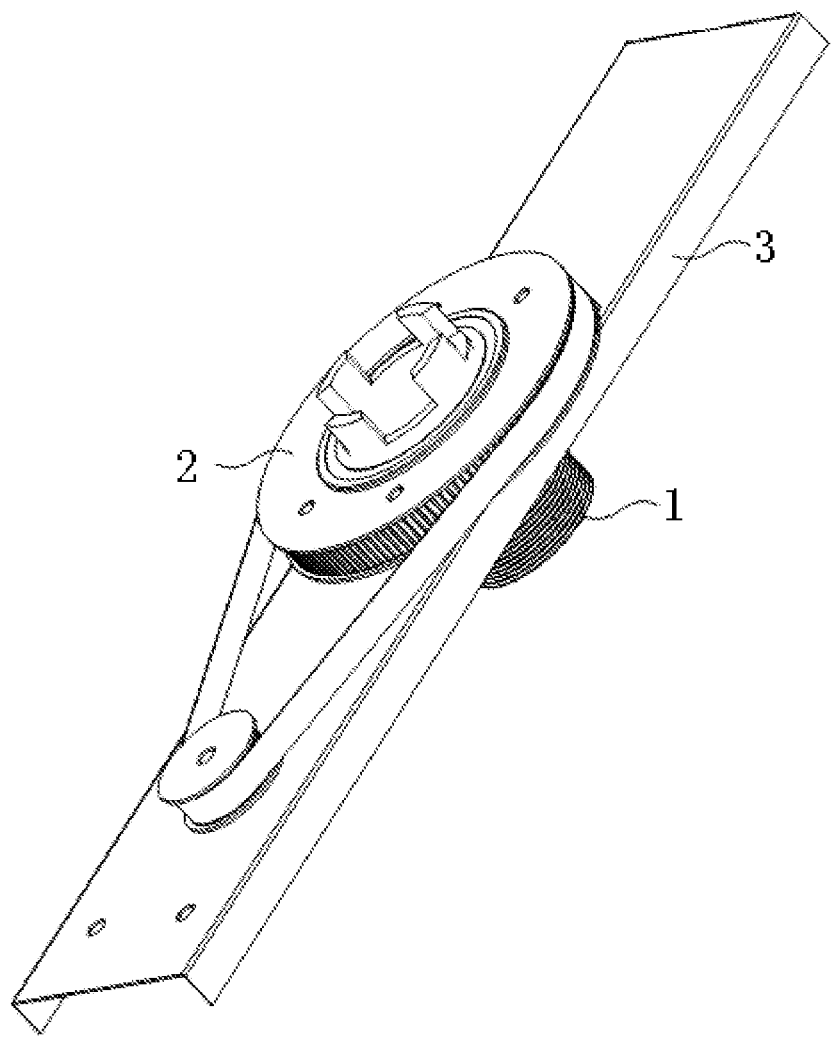
FIG. 2A is another schematic diagram of connection of a support driving structure of the photo booth according to one embodiment of the present disclosure.

As shown in FIGS. 1-2, the driven wheel 2 is a gear.

When the rotating device 5 is a motor, a driving gear is disposed on a power output shaft of the motor. The driving gear is engaged with the driven wheel 2 configured as the gear for transmission, driving the driven wheel 2 and the rotating arm 3 to rotate around the supporting main shaft 1.

In some embodiments, the driven wheel 2 is a belt wheel.

When the rotating device 5 is the motor, a driving belt wheel is disposed on the power output shaft of the motor. The driving belt wheel is connected to the driven wheel 2 configured as the belt wheel through a transmission belt, so as to drive the driven wheel 2 and the rotating arm 3 to rotate around the supporting main shaft 1.

As shown in FIGS. 1-2, the driven wheel 2 is rotatably connected to the supporting main shaft 1 through a bearing 4.

The bearing 4 reduces a friction force between the driven wheel 2 and the supporting main shaft 1, which prolongs service life of the present disclosure.

As shown in FIGS. 1-2, the rotating arm 3 is connected to the end surface of the driven wheel 2 through screws.

The rotating arm 3 is connected to the end surface of the driven wheel 2 through the screws, achieving a detachable connection, facilitating maintenance and replacement of components thereof, and improving repair convenience.

In some embodiments, the rotating arm 3 is connected to the end surface of the driven wheel 2 through welding.

By connecting the rotating arm 3 and the end surface of the driven wheel 2 through welding, connection strength and integration between the rotating arm 3 and the driven wheel 2 are improved to prevent a case that the screws may lose when using the screws for connection.

As shown in FIGS. 1-5, the rotating arm 3 is of a frame structure.

This structure enhances structural stability of the rotating arm 3 and ensures good balance and support of the shooting device without use of the counterweight structure.

Embodiment 1

Figure 3:
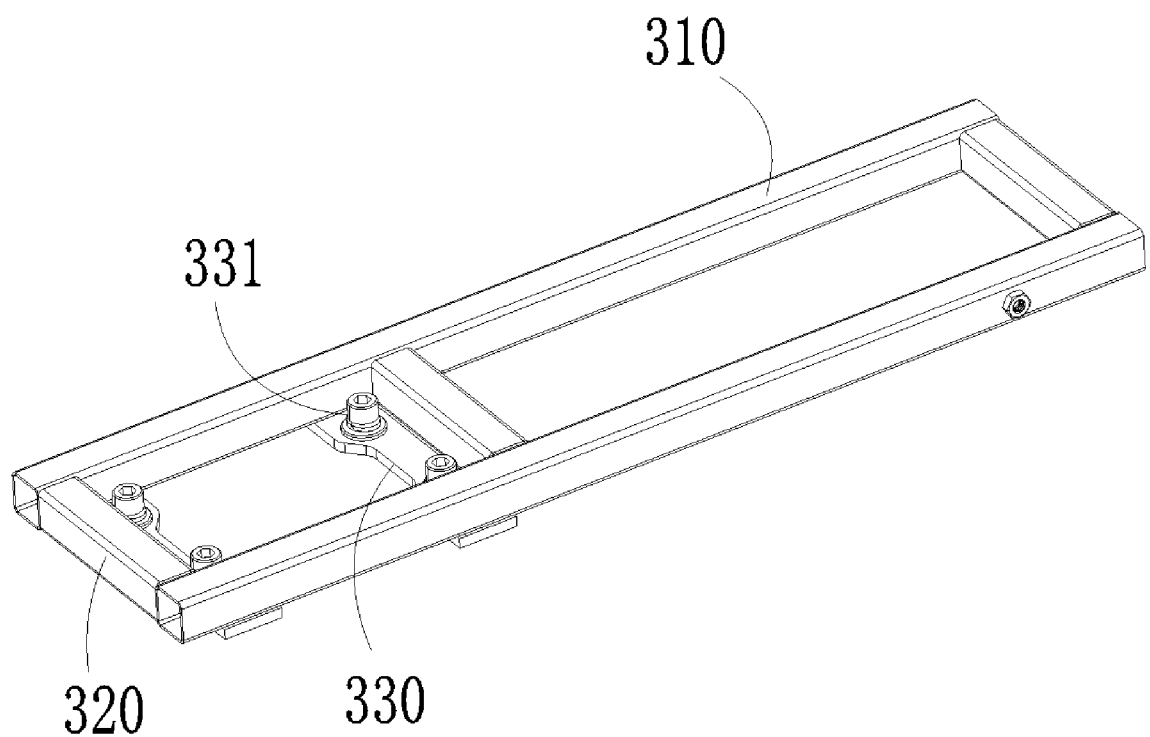
FIG. 3 is a structural schematic diagram of a rotating arm of the support driving structure of the photo booth according to a first embodiment of the present disclosure.

As shown in FIGS. 1-3, the rotating arm 3 includes long rods 310, short rods 320, and connecting sheets 330. Two ends of each of the short rods 320 are connected to the two long rods 310. Two ends of each of the connecting sheets 330 are connected to the two long rods 310. Connecting positions 331 are defined on the connecting sheets 330. Connecting portions 210 corresponding to the connecting positions 331 are disposed on the driven wheel 2.

The number of the short rods 320 is multiple, and the two ends of each of the short rods 320 are connected to the long rods 310 to form the frame structure. The connecting positions 331 on the connecting sheets 330 are welding positions according to needs, or the connecting positions 331 are connecting holes when the connecting portions 210 on the driven wheel 2 are welding positions, or the connecting positions 331 are the connecting holes connecting with the connecting portions 210 through the screws.

Embodiment 2

Figure 4:
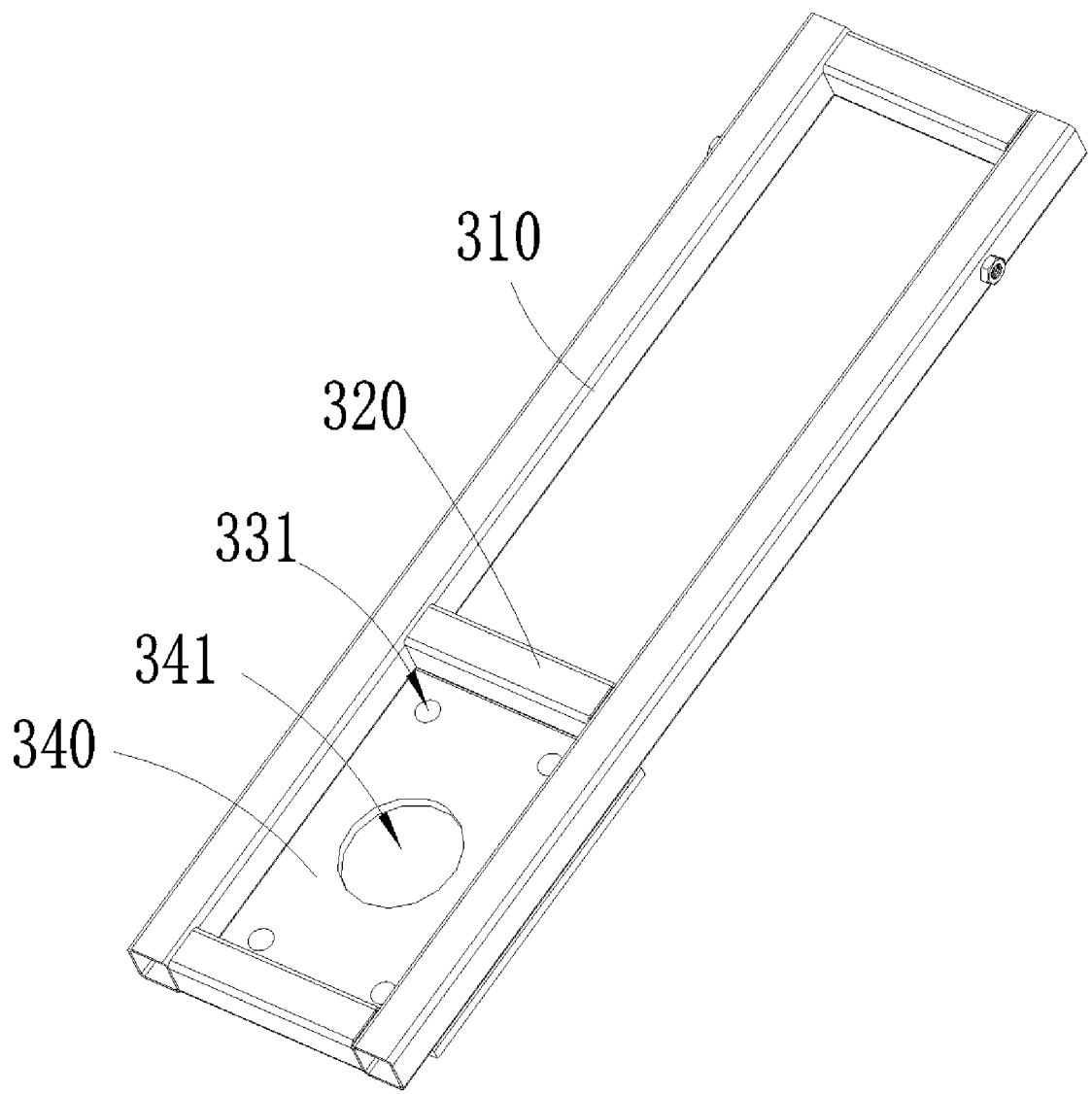
FIG. 4 is a structural schematic diagram of the rotating arm of the support driving structure of the photo booth according to a second embodiment of the present disclosure.

As shown in FIG. 4, the rotating arm 3 includes long rods 310, short rods 320, and a connecting plate 340. Two ends of each of the short rods 320 are connected to the two long rods 310. Four edges of the connecting plate 340 are connected to the short rods 320 and the long rods 310. Connecting positions 331 are defined on the connecting plate 340. Connecting portions 210 corresponding to the connecting positions 331 are disposed on the driven wheel 2. A limiting hole 341 is defined on the connecting plate 340. The limiting hole 341 allows the supporting main shaft 1 to pass through.

Compared to Embodiment 1, the connecting positions 331 are disposed on the connecting plate 340 while the connecting positions 331 in Embodiment 1 are respectively disposed on two or more connecting sheets 330. Therefore, a trouble of connecting the two or more connecting sheets 330 to the long rods 310 is avoided. The limiting hole 341 defines a space for the supporting main shaft to pass through and avoids affecting the supporting main shaft 1.

Embodiment 3

Figure 5:
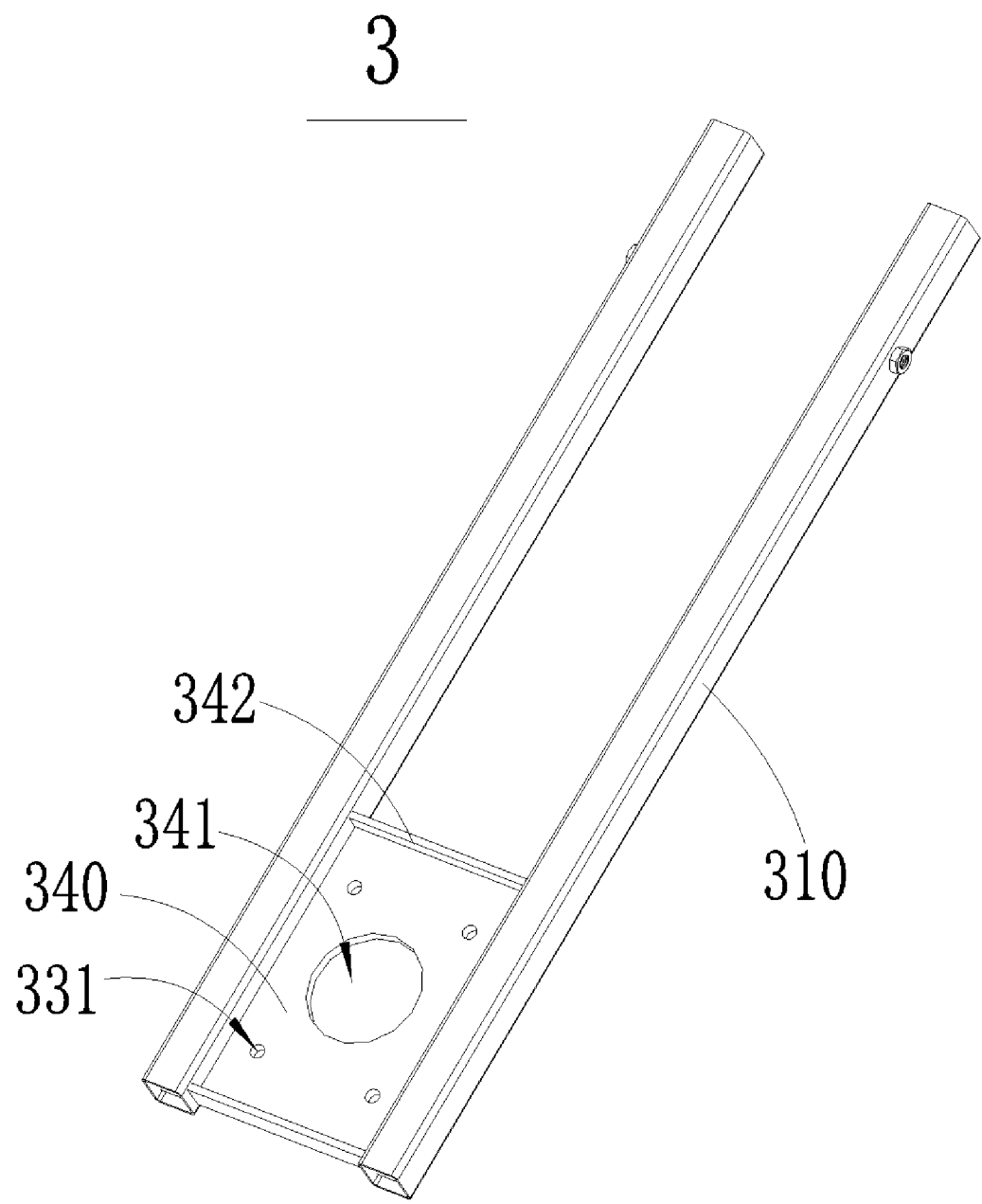
FIG. 5 is a structural schematic diagram of the rotating arm of the support driving structure of the photo booth according to a third embodiment of the present disclosure.

As shown in FIG. 5, the rotating arm 3 includes long rods 310 and a connecting plate 340. A first edge and a second edge of the connecting plate 340 are connected to the two long rods 310. A third edge and a fourth edge of the connecting plate 340 are bending edges 342. Connecting positions 331 are defined on the connecting plate 340. Connecting portions 210 corresponding to the connecting positions 340 are disposed on the driven wheel 2. A limiting hole 341 is defined on the connecting plate 340. The limiting hole 341 allows the supporting main shaft 1 to pass through.

Compared to Embodiment 1 and Embodiment 2, the rotating arm 3 eliminates the short rods 320 and simplifies the frame structure in a premise of achieving good support stability, making it more convenient for processing the rotating arm 3 and reducing production costs. The two bending edges 342 of the connecting plate 340 that are not connected to the long rods 310 enhance structural strength and stability of the connecting plate 340.

What is claimed is:

1. A support driving structure of a photo booth, comprising:
   a supporting main shaft;
   a driven wheel; and
   a rotating arm;
   wherein the driven wheel is sleeved on the supporting main shaft and is rotatably connected to the supporting main shaft; and the rotating arm is connected to an end surface of the driven wheel;
   wherein the rotating arm is of a frame structure;
   wherein the rotating arm comprises lengthwise rods, transverse rods, and connecting sheets; two ends of each of the transverse rods are respectively connected to the two lengthwise rods, each of the connecting sheets are respectively connected to the two lengthwise rods, a plurality of connecting positions are defined on the connecting sheets, and connecting portions corresponding to the connecting positions are disposed on the driven wheel.

2. The support driving structure of the photo booth according to claim 1, wherein the driven wheel is a gear.

3. The support driving structure of the photo booth according to claim 1, wherein the driven wheel is a belt wheel.

4. The support driving structure of the photo booth according to claim 1, wherein the driven wheel is rotatably connected to the supporting main shaft through a bearing.

5. The support driving structure of the photo booth according to claim 1, wherein the rotating arm is connected to the end surface of the driven wheel through screws.

6. The support driving structure of the photo booth according to claim 1, wherein the rotating arm is connected to the end surface of the driven wheel through welding.

7. The support driving structure of the photo booth according to claim 1, wherein the rotating arm is disposed on the driven wheel by the connecting sheets.

8. A support driving structure of a photo booth, comprising:
   a supporting main shaft;
   a driven wheel; and
   a rotating arm;
   wherein the driven wheel is sleeved on the supporting main shaft and is rotatably connected to the supporting main shaft; and the rotating arm is connected to an end surface of the driven wheel;
   wherein the rotating arm is of a frame structure;
   wherein the rotating arm comprises lengthwise rods, transverse rods, and a connecting plate; two ends of each of the transverse rods are respectively connected to the two lengthwise rods, four edges of the connecting plate are respectively connected to the transverse rods and the lengthwise rods; a plurality of connecting positions are defined on the connecting plate, connecting portions corresponding to the connecting positions are disposed on the driven wheel; a limiting hole is defined on the connecting plate, and the limiting hole allows the supporting main shaft to pass through.

9. The support driving structure of the photo booth according to claim 8, wherein the driven wheel is a gear.

10. The support driving structure of the photo booth according to claim 8, wherein the driven wheel is rotatably connected to the supporting main shaft through a bearing.

11. The support driving structure of the photo booth according to claim 8, wherein the rotating arm is connected to the end surface of the driven wheel through screws.

12. The support driving structure of the photo booth according to claim 8, wherein the rotating arm is connected to the end surface of the driven wheel through welding.

13. The support driving structure of the photo booth according to claim 8, wherein the rotating arm is disposed on the driven wheel by the connecting plate.

14. A support driving structure of a photo booth, comprising:
    a supporting main shaft;
    a driven wheel; and
    a rotating arm;
    wherein the driven wheel is sleeved on the supporting main shaft and is rotatably connected to the supporting main shaft; and the rotating arm is connected to an end surface of the driven wheel;
    wherein the rotating arm is of a frame structure;
    wherein the rotating arm comprises two lengthwise rods and a connecting plate; a first edge and a second edge of the connecting plate are respectively connected to the two lengthwise rods, a third edge and a fourth edge of the connecting plate are bending edges; a plurality of connecting positions are defined on the connecting plate, connecting portions corresponding to the connecting positions are disposed on the driven wheel; a limiting hole is defined on the connecting plate, and the limiting hole allows the supporting main shaft to pass through.

15. The support driving structure of the photo booth according to claim 14, wherein the driven wheel is a gear.

16. The support driving structure of the photo booth according to claim 15, wherein the driven wheel is rotatably connected to the supporting main shaft through a bearing.

17. The support driving structure of the photo booth according to claim 16, wherein the rotating arm is connected to the end surface of the driven wheel through screws.

18. The support driving structure of the photo booth according to claim 16, wherein the rotating arm is connected to the end surface of the driven wheel through welding.

19. The support driving structure of the photo booth according to claim 18, wherein the rotating arm is disposed on the driven wheel by the connecting plate.

* * * * *